(12) United States Patent
Jiang et al.

(10) Patent No.: US 12,185,238 B2
(45) Date of Patent: Dec. 31, 2024

(54) METHOD, APPARATUS, AND SYSTEM FOR CONFIGURING IMAGE FORMING APPARATUS NETWORK (71) Applicant: Zhuhai Pantum Electronics Co., Ltd., Zhuhai (CN)

(72) Inventors: Yongjiu Jiang, Zhuhai (CN); Longwei Ma, Zhuhai (CN)

(73) Assignee: ZHUHAI PANTUM ELECTRONICS CO., LTD., Zhuhai (CN)

(*) Notice: Subject to any disclaimer, the term of this patent is extended or adjusted under 35 U.S.C. 154(b) by 385 days.

(21) Appl. No.: 17/697,598

(22) Filed: Mar. 17, 2022

(65) Prior Publication Data
US 2022/0303889 A1 Sep. 22, 2022

(30) Foreign Application Priority Data
Mar. 22, 2021 (CN) .......................... 202110303768.6

(51) Int. Cl.
H04W 48/20 (2009.01)
H04L 41/0806 (2022.01)
(Continued)

(52) U.S. Cl.
CPC ......... H04W 48/20 (2013.01); H04L 41/0806 (2013.01); H04W 8/005 (2013.01); H04W 12/06 (2013.01); H04W 76/10 (2018.02)

(58) Field of Classification Search
CPC ..... H04W 48/20; H04W 8/005; H04W 12/06; H04W 76/10; H04W 48/18; H04W 12/50; H04W 84/12; H04W 12/009; H04L 41/0806; G06F 3/1222; G06F 3/1238; G06F 3/128; G06F 21/608; G06F 3/1203; G06F 3/1236; G06F 3/1292
See application file for complete search history.

(56) References Cited

U.S. PATENT DOCUMENTS 10,791,242 B2 9/2020 Ikeda
2006/0106918 A1 5/2006 Evert et al.
(Continued)

FOREIGN PATENT DOCUMENTS

CN 103763450 A 4/2014
CN 103795882 A 5/2014
(Continued)

Primary Examiner — Omer S Mian
(74) Attorney, Agent, or Firm — ANOVA LAW GROUP, PLLC (57) ABSTRACT Embodiments of the present disclosure provide a method, an apparatus, and a system for configuring an image forming apparatus network. The method includes receiving wireless connection information transmitted by an information processing apparatus, where the received wireless connection information includes a service set identifier (SSID) of a wireless access point (AP); searching neighboring wireless APs; and obtaining and storing SSIDs, encryption manners, and protected management frame (PMF) attributes of the searched wireless APs; comparing the received SSID with the stored SSIDs; and if there is consistency, obtaining an encryption manner and a PMF attribute of the received SSID, and generating a configuration file; and connecting a wireless network according to the configuration file.

13 Claims, 5 Drawing Sheets (51) Int. Cl.
*H04W 8/00* (2009.01)
*H04W 12/06* (2021.01)
*H04W 76/10* (2018.01)

(56) References Cited

U.S. PATENT DOCUMENTS

| | | | | |
|---|---|---|---|---|
| 2015/0289225 | A1* | 10/2015 | Gao | G01S 5/0295 |
| | | | | 455/456.5 |
| 2019/0012117 | A1* | 1/2019 | Zhao | H04N 1/32122 |
| 2019/0053137 | A1 | 2/2019 | Watanabe | |
| 2019/0104561 | A1* | 4/2019 | Fujinaga | H04W 12/08 |
| 2019/0289539 | A1* | 9/2019 | Lee | H04W 84/18 |
| 2020/0162633 | A1 | 5/2020 | Ikeda | |

FOREIGN PATENT DOCUMENTS

| | | | |
|---|---|---|---|
| CN | 108882343 | A | 11/2018 |
| CN | 110730114 | A | 1/2020 |
| EP | 1657855 | A1 | 5/2006 |

* cited by examiner

METHOD, APPARATUS, AND SYSTEM FOR CONFIGURING IMAGE FORMING APPARATUS NETWORK

CROSS-REFERENCE TO RELATED APPLICATION

This application claims the priority to Chinese patent application No. 202110303768.6, filed on Mar. 22, 2021, in the China National Intellectual Property Administration, the entirety of which is incorporated herein by its reference.

TECHNICAL FIELD

The present disclosure generally relates to the field of network technology and, more particularly, relates to a method, an apparatus, and a system for configuring an image forming apparatus network.

BACKGROUND

A currently commonly used manner to configure a wireless network of an image forming apparatus (such as a printer) is searching an AP (access point) list in a current environment using a network configuration tool of an information processing apparatus (such as a computer); transmitting an SSID (service set identifier), an encryption manner, and a password (inputted by a user) of a user-specified wireless AP to the image forming apparatus; and connecting the image forming apparatus to the wireless AP according to received wireless connection information.

The encryption manners of wireless APs may include WEP (wired equivalent privacy), WPA (Wi-Fi protected access), WPA2, and WPA3.

When the encryption manner of the wireless AP is configured to be WPA3, the PMF (protected management frames) attribute may be forced to be enabled by default. If a driver version of a wireless network adapter of the information processing apparatus is relatively low, the WPA3 encryption manner and PMF attribute of the wireless AP may not be correctly obtained, and correct wireless connection information may not be transmitted to the image forming apparatus, resulting in the image forming apparatus failing to be connected to the wireless network.

SUMMARY

One aspect of the present disclosure provides a method for configuring an image forming apparatus network. The method includes receiving wireless connection information transmitted by an information processing apparatus, where the received wireless connection information includes a service set identifier (SSID) of a wireless access point (AP); searching neighboring wireless APs; and obtaining and storing SSIDs, encryption manners, and protected management frame (PMF) attributes of the searched wireless APs; comparing the received SSID with the stored SSIDs; and if there is consistency, obtaining an encryption manner and a PMF attribute of the received SSID, and generating a configuration file; and connecting a wireless network according to the configuration file.

Another aspect of the present disclosure provides a system for configuring an image forming apparatus network. The system includes an information processing apparatus and an image forming apparatus. The information processing apparatus includes a memory, storing a program; and a processor, coupled with the memory and when the program being executed, configured to search neighboring wireless APs and obtain a list of the searched wireless APs; and transmit wireless connection information of a wireless AP specified by a user to the image forming apparatus, where the wireless connection information includes an SSID of the specified wireless AP. The image forming apparatus includes a memory, storing a program for performing a method for configuring an image forming apparatus network; and a processor, coupled with the memory and when the program being executed, configured to receive the wireless connection information transmitted by the information processing apparatus; search the neighboring wireless APs; and obtain and store SSIDs, encryption manners, and protected management frame (PMF) attributes of the searched wireless APs; compare the received SSID with the stored SSIDs; and if there is consistency, obtain an encryption manner and a PMF attribute of the received SSID, and generate a configuration file; and connect a wireless network according to the configuration file.

Another aspect of the present disclosure provides a non-transitory computer-readable storage medium containing a computer program, and when being executed, the computer program causes a processor to perform a method for configuring an image forming apparatus network. The method includes receiving wireless connection information transmitted by an information processing apparatus, where the received wireless connection information includes a service set identifier (SSID) of a wireless access point (AP); searching neighboring wireless APs; and obtaining and storing SSIDs, encryption manners, and protected management frame (PMF) attributes of the searched wireless APs; comparing the received SSID with the stored SSIDs; and if there is consistency, obtaining an encryption manner and a PMF attribute of the received SSID, and generating a configuration file; and connecting a wireless network according to the configuration file.

Other aspects of the present disclosure can be understood by those skilled in the art in light of the description, the claims, and the drawings of the present disclosure.

BRIEF DESCRIPTION OF THE DRAWINGS

To clearly describe the technical solutions of various embodiments of the present disclosure, the drawings need to be used for describing various embodiments are described below. Obviously, the drawings in the following description are merely some embodiments of the present disclosure. For those skilled in the art, other drawings may be obtained in accordance with these drawings without creative efforts.

DETAILED DESCRIPTION

To better understand the technical solutions of the present disclosure, embodiments of the present disclosure are described in detail below with reference to accompanying drawings.

It should be noted that described embodiments are only some, but not all, embodiments of the present disclosure. Based on embodiments of the present disclosure, all other embodiments obtained by those skilled in the art without creative efforts shall fall within the protection scope of the present disclosure.

The image forming apparatus is an apparatus having at least one function related to image formation. The above-mentioned functions related to image formation may include, but not be limited to, a printing function, a scanning function, a copying function, and a facsimile function.

A single-function printer is an image forming apparatus with a printing function only.

A multi-function printer is an image forming apparatus with printing, copying, scanning, and/or faxing functions; and the number of paper trays may be selectively configured.

For a digital compound machine, based on the copying function with standard or optional printing, scanning, faxing functions, the file output may be performed by a laser printing manner using digital principle; and images and texts may be edited as needed. The digital compound machine may have a large capacity paper tray, with high memory, large hard disk, strong network support and multitasking parallel processing capability.

An information processing apparatus refers to an electronic device, such as a computer, that can transmit information such as job data and the like to the image forming apparatus.

The following describes a scenario applicable to a method for configuring an image forming apparatus network hereinafter. A system applicable to the method provided by embodiments of the present disclosure shown in FIG. 1 may include an information processing apparatus 10 and an image forming apparatus 20. The image forming apparatus 20 may perform communication with the information processing apparatus 10 via a wired network, a USB, or a wireless local area network; and may also be connected to each other through a wireless direct connection (such as NFC, Bluetooth, infrared, soft AP, or Wi-Fi Direct).

Figure 1:
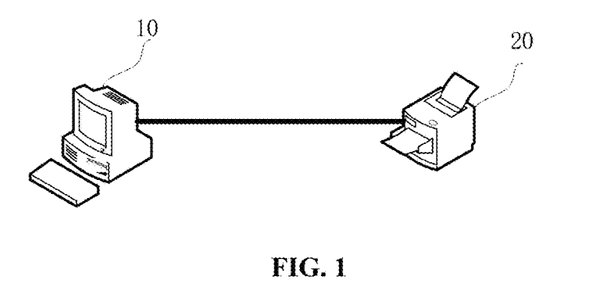
FIG. 1 illustrates a schematic of a scenario applicable to a method for configuring an image forming apparatus network provided by exemplary embodiments of the present disclosure.

To make the information processing apparatus 10 capable of performing communication by connecting to a same wireless AP as the image forming apparatus 20, the image forming apparatus 20 may need to be configured for connecting the wireless network where the wireless AP is located.

Figure 2A:
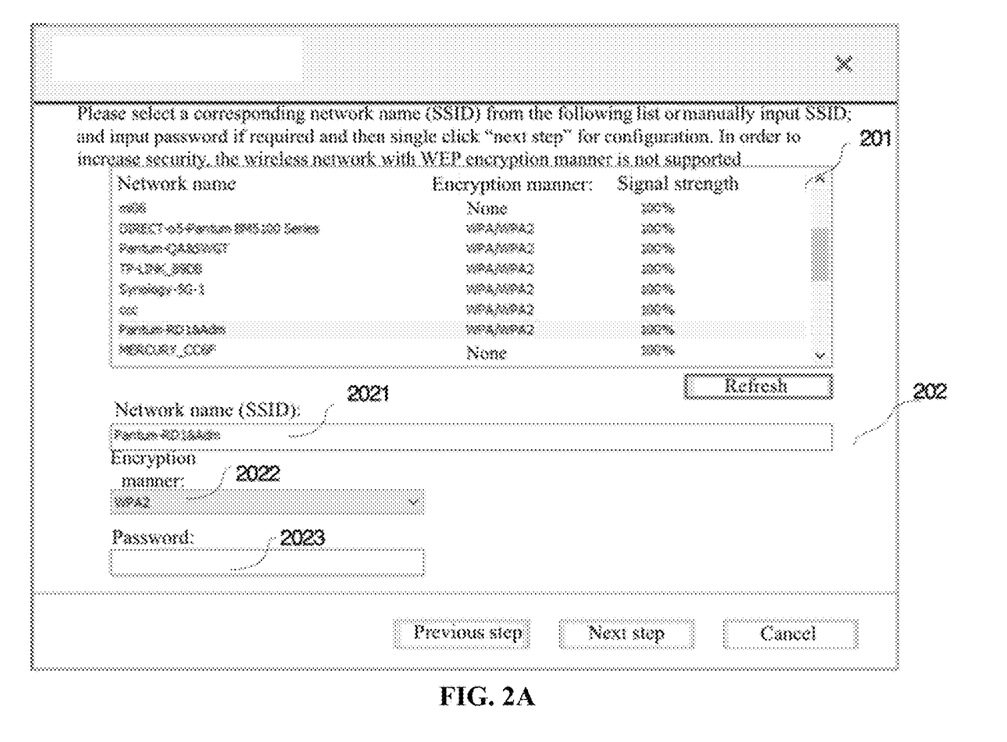
FIG. 2A illustrates a schematic of a display interface of an application program.
Figure 2B:
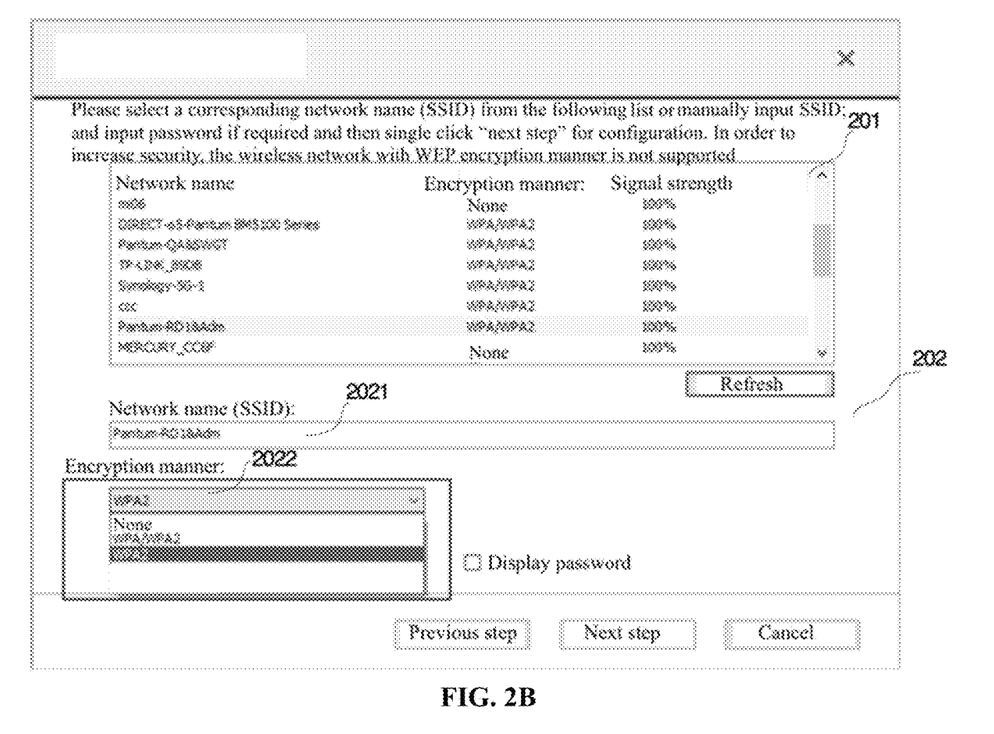
FIG. 2B illustrates a schematic of another display interface of an application program.

FIG. 2A illustrates a schematic of a display interface of an application program in the existing technology; and FIG. 2B illustrates a schematic of another display interface of an application program in the existing technology. The application may be used to configure the image forming apparatus network, such that the image forming apparatus may be connected to a wireless network. The application may be a network configuration tool and installed in the information processing apparatus 10.

In FIG. 2A, a region 201 may display a searched wireless AP list when the information processing apparatus searches wireless APs. The wireless AP list may include network names, encryption manners, signal strengths, and other information of the wireless APs. The region 202 may display a network name (i.e., SSID), a password, and an encryption manner required by a user to specify the wireless AP to which the image forming apparatus is connected. When the user selects a wireless AP in the wireless AP list, an input box 2021 may be automatically filled with the network name of the selected wireless AP, and the input box 2022 may be automatically filled with the encryption manner corresponding to the wireless AP. When the selected wireless AP needs an encrypted connection, the user may need to enter a password in the input box 2023; after clicking Next step, the information processing apparatus 10 may transmit the network name, encryption manner and password of the wireless AP selected by the user to the image forming apparatus 20, through a wireless manner (such as a soft AP connected to the image forming apparatus) or a wired manner (e.g., a USB or wired network). Obviously, the user may also manually input a network name in the input box 2021 of the region 202 without selecting a wireless AP in the region 201 to connect the image forming apparatus 20 and may manually fill in an encryption manner in the input box 2022 or select an encryption manner in the drop-down menu of the input box 2022. If the wireless AP corresponding to manually entered network name requires a password for connection, the password may need to be entered in the input box 2023, and if an open wireless AP is connected, no password may need to be entered.

The interface of above-mentioned application program may have a problem that when the driver version of the wireless network adapter installed in the information processing apparatus 10 is relatively low and searching wireless APs is performed, for the wireless AP that the encryption manner is WPA3, the wireless network adapter of the information processing apparatus 10 may not obtain a correct encryption manner. As shown in FIG. 2B, when the user selects a wireless AP that the encryption manner is WPA3 in the wireless AP list, the information filled in the input box 2022 may be empty, or the encryption manner may be wrong. As a result, the information transmitted to the image forming apparatus 20 may be wrong and the image forming apparatus 20 may fail to be connected to the wireless network. If the user is asked to select an encryption manner, a wrong encryption manner may be selected from the encryption manners displayed by the drop-down menu in the input box 2022. When the encryption manner of the wireless AP is continuously updated, the selection options of the drop-down menu in the input box 2022 may need to be updated in time, otherwise the user may not select the correct encryption manner.

Embodiment One

Embodiment one of the present disclosure provides a method for configuring an image forming apparatus network. The success rate of the image forming apparatus connecting to the wireless network may be improved through such method.

Figure 4:
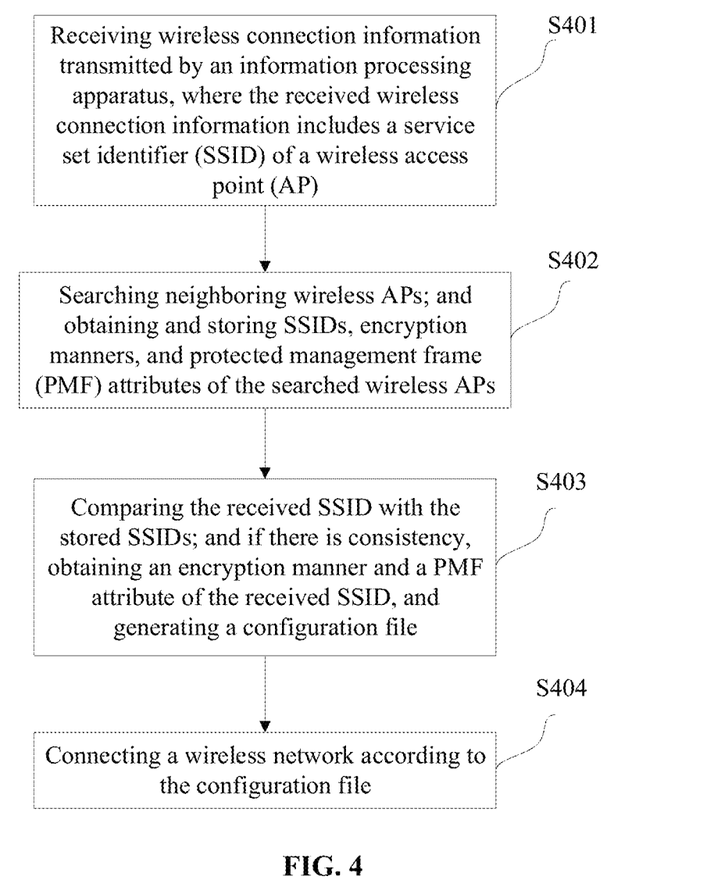
FIG. 4 illustrates a schematic flowchart of a method for configuring an image forming apparatus network provided by embodiment one of the present disclosure.

As shown in FIG. 4, a method for configuring an image forming apparatus network may include following exemplary steps.

At S401, wireless connection information transmitted by the information processing apparatus may be received, where the wireless connection information may include an SSID of a wireless AP.

At S402, neighboring wireless APs may be searched; and the SSIDs, encryption manners, PMF attributes of the searched wireless APs may be obtained and stored.

At S403, the received SSID and the stored SSIDs may be compared with each other. If there is consistency, the encryption manner, PMF attribute of the received SSID may be obtained; and a configuration file may be generated.

At S404, a wireless network may be connected according to the configuration file.

According to embodiments of the present disclosure, the image forming apparatus may receive external wireless connection information transmitted, and the image forming apparatus may execute automatic connection to the wireless network with obtained encryption manner and communication attributes needed through searching the wireless AP corresponding to the wireless connection information by itself, which may avoid the user's step of configuring various unfamiliar network properties and improve configuration speed and success rate.

In the method of one embodiment, searching neighboring wireless APs may include performing an all-channel scanning of the neighboring wireless APs; continuously transmitting multiple probe request frames one by one from a low channel to a high channel; and analyzing received probe response frames and beacon frames that are actively transmitted by the neighboring wireless APs.

The all-channel scanning may be to perform scanning channels one by one according to all channels supported by the country code configured by the image forming apparatus.

For example, the scanning process performed by the image forming apparatus may include following exemplary steps.

a) A Wi-Fi driver may start scanning, and a command may first be transmitted to notify a Wi-Fi chip to send received Beacon and Probe Response frames to a Wi-Fi drive layer.

b) According to supported channels, the Wi-Fi driver may transmit three Probe Request frames continuously for 2.4G and 5G from a low channel to a high channel one by one, with each interval of 50 milliseconds, and then may jump to a next channel.

c) The Wi-Fi driver may analyze all received Probe Response frames and Beacon (e.g., signal) frames actively transmitted by the wireless APs.

d) The scan result may be processed, duplicate wireless AP information may be discarded, and the scan result may be saved in the memory of the image forming apparatus.

Through all-channel scanning, detailed information of neighboring wireless APs may be obtained, and automatic connection to the wireless network may be performed according to obtained detailed information of wireless APs to ensure successful connection.

Furthermore, before receiving the wireless connection information transmitted by the information processing apparatus, the method may further include that the information processing apparatus may scan the neighboring wireless APs and display a list of searched wireless APs. The user may specify a wireless AP that needs to be connected according to the wireless AP list and may not need to specify an encryption manner.

In embodiments of the present disclosure, the user may not need to configure the encryption manner, which may avoid the user configuration step and prevent the user from selecting a wrong encryption manner. The design of the present disclosure may not require the user to manually configure or select the encryption manner of the wireless AP, which may be particularly convenient for the user to quickly configure the wireless network of the image forming apparatus and be extremely convenient for users who do not have network knowledge.

Figure 3:
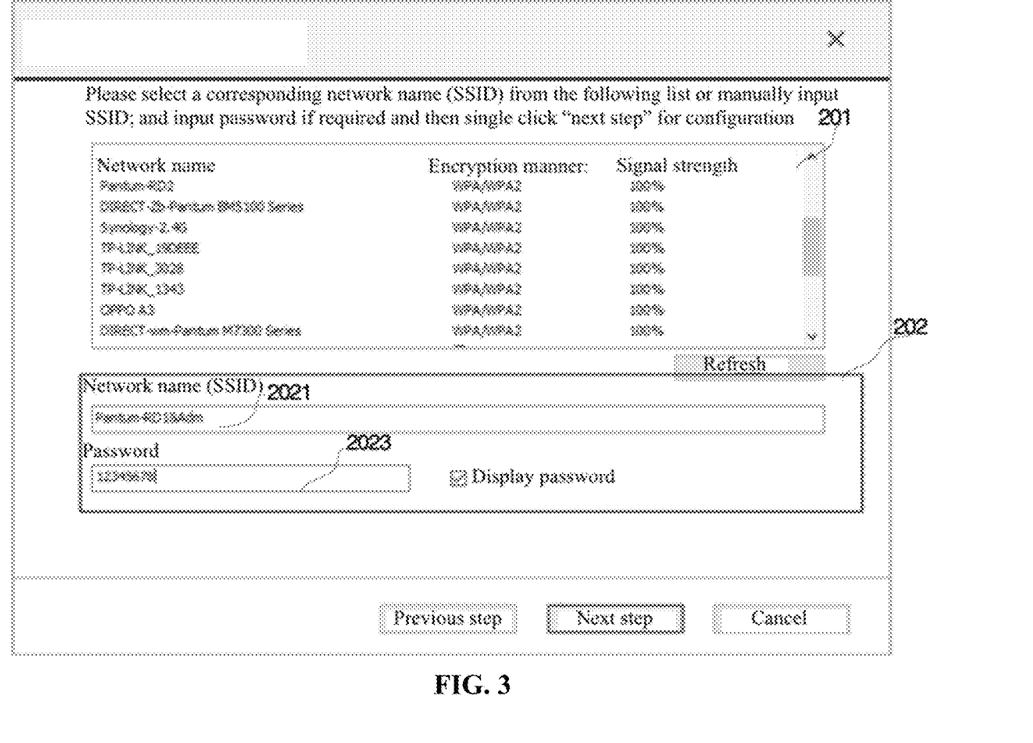
FIG. 3 illustrates a schematic of a display interface of an improved application program provided by exemplary embodiments of the present disclosure.

As shown in FIG. 3, according to the design of the present disclosure, the interface displayed by the application program may be different from that shown in FIGS. 2A-2B. The user may only need to select a wireless AP in the wireless AP list, there may only be two input boxes 2021 and 2203 in the region 202, and the user may fill in at most two input boxes, which may avoid the user's selection of encryption manner. Through the improvement in the present disclosure, it reduces problem that the WPA3 encryption manner may not be obtained due to the side of the information processing apparatus uses the wireless network adapter with a low version driver; and the user's operation may be simplified to make the network configuration more convenient and easier to understood.

When the encryption manner of the wireless AP is upgraded to the latest encryption manner (WPA3 is the latest encryption manner), the method provided by embodiments of the present disclosure may not need to make any modifications corresponding to the information processing apparatus side according to the encryption manner upgrade, which may be convenient to maintain the network configuration tool of the image forming apparatus.

Embodiment Two

Figure 5:
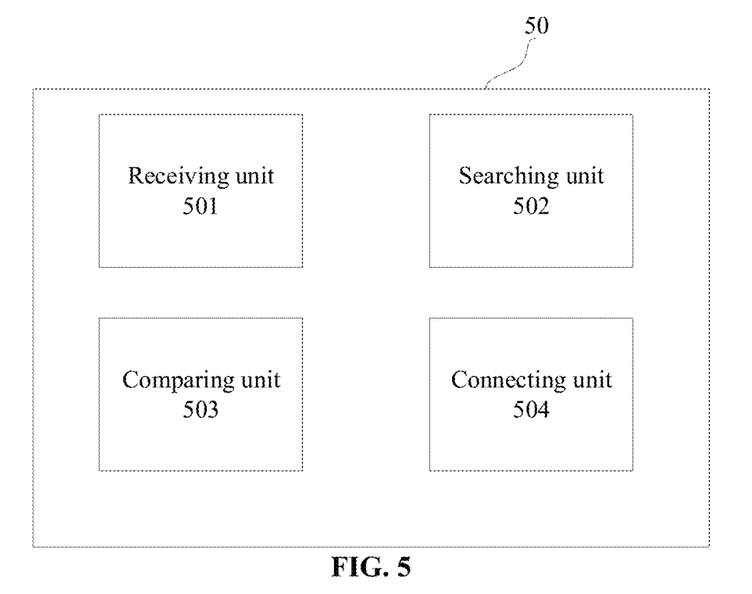
FIG. 5 illustrates a schematic of elements of an apparatus for configuring an image forming apparatus network provided by embodiment two of the present disclosure.

Embodiment two of the present disclosure provides an apparatus 50 for configuring an image forming apparatus network. As shown in FIG. 5, the apparatus 50 may include a receiving unit 501, a searching unit 502, a comparing unit 503, and a connecting unit 504.

The receiving unit 501 may be configured to receive wireless connection information transmitted by the information processing apparatus, where the wireless connection information may include the SSID of the wireless AP.

The searching unit 502 may be configured to search neighboring wireless APs, and obtain and store SSIDs, encryption manners, and PMF attributes of searched wireless APs.

The comparing unit 503 may be configured to compare whether the received SSID is consistent with the stored SSIDs; and if there is consistency, obtain the encryption manner and PMF attribute of the received SSID, and generate the configuration file.

The connecting unit 504 may be configured to connect to the wireless network according to the configuration file.

According to embodiments of the present disclosure, the apparatus 50 may be a part of the image forming apparatus and receive external wireless connection information transmitted; and the image forming apparatus may execute automatic connection to the wireless network with obtained encryption manner and communication attributes needed through searching the wireless AP corresponding to the wireless connection information by itself, which may avoid the user's step of configuring various unfamiliar network properties and improve configuration speed and success rate.

Searching neighboring wireless APs by the searching unit 502 may include performing the all-channel scanning of the neighboring wireless APs; continuously transmitting multiple probe request frames one by one from a low channel to a high channel; and analyzing received probe response frames and beacon frames that are actively transmitted by the neighboring wireless APs. Through all-channel scanning, detailed information of neighboring wireless APs may be obtained, and automatic connection to the wireless network may be performed according to obtained detailed information of wireless APs to ensure successful connection.

The wireless connection information received by the receiving unit 503 may not include an encryption manner. In embodiments of the present disclosure, the user may not need to configure the encryption manner, which may avoid the user configuration step and prevent the user from selecting a wrong encryption manner.

The part of embodiment two which is same as the above-mentioned embodiment one may not be described in detail herein.

Embodiment Three

Embodiment three of the present disclosure provides a system for configuring a mage forming apparatus network, including an information processing apparatus and an image forming apparatus.

The information processing apparatus may be configured to search neighboring wireless APs and obtain a list of the searched wireless APs; and transmit wireless connection information of a wireless AP specified by the user to the image forming apparatus, where the wireless connection information includes an SSID of the specified wireless AP.

The image forming apparatus may be configured to receive the wireless connection information transmitted by the information processing apparatus; search the neighboring wireless APs; and obtain and store SSIDs, encryption manners, and protected management frame (PMF) attributes of the searched wireless APs; compare the received SSID with the stored SSIDs; and if there is consistency, obtain an encryption manner and a PMF attribute of the received SSID, and generate a configuration file; and connect a wireless network according to the configuration file.

Searching neighboring wireless APs may include performing the all-channel scanning of the neighboring wireless APs; continuously transmitting multiple probe request frames one by one from a low channel to a high channel; and analyzing received probe response frames and beacon frames that are actively transmitted by the neighboring wireless APs.

Optionally, the wireless connection information may not include an encryption manner. In embodiments of the present disclosure, the user may not need to configure the encryption manner, which may avoid the user configuration step and prevent the user from selecting a wrong encryption manner.

In embodiments of the present disclosure, the image forming apparatus may obtain the encryption manner and PMF attribute of the wireless AP which encryption manner is WPA3 by performing the all-channel scanning of the neighboring wireless APs, and may reduce that the WPA3 encryption manner and PMF attribute may not be obtained due to the side of the information processing apparatus uses the wireless network adapter with a low version driver, and ensure the success rate of connecting to the wireless network.

In embodiments of the present disclosure, when the parameter of the specified wireless AP is inputted at side of the information processing apparatus, it does not need to consider the encryption manner of the specified wireless AP and whether PMF needs to be enabled, which may be convenient for the user to quickly configure the network of the image forming apparatus.

When the encryption manner of the wireless AP is upgraded to the latest encryption manner, the method provided by embodiments of the present disclosure may not need any upgrade changes on the side of the information processing apparatus according to the upgrade of the encryption manner, which may be convenient for maintaining the network configuration tool of the image forming apparatus.

The part of embodiment three which is same as the above-mentioned embodiment one may not be described in detail herein.

Embodiments of the present disclosure further provide a system for configuring an image forming apparatus network. The system includes an information processing apparatus and an image forming apparatus. The information processing apparatus includes a memory, storing a program; and a processor, coupled with the memory and when the program being executed, configured to search neighboring wireless APs and obtain a list of the searched wireless APs; and transmit wireless connection information of a wireless AP specified by a user to the image forming apparatus, where the wireless connection information includes an SSID of the specified wireless AP. The image forming apparatus includes a memory, storing a program for performing a method for configuring an image forming apparatus network; and a processor, coupled with the memory and when the program being executed, configured to receive the wireless connection information transmitted by the information processing apparatus; search the neighboring wireless APs; and obtain and store SSIDs, encryption manners, and protected management frame (PMF) attributes of the searched wireless APs; compare the received SSID with the stored SSIDs; and if there is consistency, obtain an encryption manner and a PMF attribute of the received SSID, and generate a configuration file; and connect a wireless network according to the configuration file.

Embodiments of the present disclosure further provide a non-transitory computer-readable storage medium containing a computer program, and when being executed, the computer program causes a processor to perform a method for configuring an image forming apparatus network. The method includes receiving wireless connection information transmitted by an information processing apparatus, where the received wireless connection information includes an SSID of a wireless AP; searching neighboring wireless APs; and obtaining and storing SSIDs, encryption manners, and PMF attributes of the searched wireless APs; comparing the received SSID with the stored SSIDs; and if there is consistency, obtaining an encryption manner and a PMF attribute of the received SSID, and generating a configuration file; and connecting a wireless network according to the configuration file.

According to the present disclosure, no matter whether the encryption manner of the wireless AP specified by the user is WPA, WPA2 or the latest WPA3, the image forming apparatus may complete wireless connection by performing the all-channel scanning to obtain the encryption manner and PMF attribute of the specified wireless AP. Furthermore, even if the encryption manner or PMF attribute configured by the user on the application program side is wrong, the image forming apparatus may still obtain correct connection parameter of the specified wireless AP according to the design of the present disclosure and may smoothly connect to the wireless AP specified by the user.

Various aspects of the present disclosure can also be implemented by a computer of a system or device (a device such as a CPU, MPU, or the like) capable of reading and executing a program recorded on a storage device, thereby realizing functions of above-described embodiments. Various aspects of the present disclosure can also be implemented by the method, each step of the method can be performed by a computer of a system or device, for example, by reading and executing a program recorded on a storage device, thereby realizing functions of above-described embodiments. For achieve such objective, the program is supplied to a computer, for example, through a network or various recording media as storage devices (e.g., computer-readable media). As such, the system or device and recording media storing the above-described program are all included within the scope of the present disclosure.

From the above-mentioned embodiments, it may be seen that the solutions provided by the present disclosure may achieve at least the following beneficial effects.

According to various embodiments of the present disclosure, when the user configures the wireless network of the image forming apparatus, the user does not need to configure or select the encryption manner of the wireless network, and the image forming apparatus may be connected to the wireless network through simple information configured by the user; in addition, when the encryption manner of the wireless network is upgraded, the side of the information processing apparatus may not need to make corresponding changes, and the user may not need to select any encryption manner, which may improve the success rate of the image forming apparatus connecting to the wireless network.

The above descriptions are only preferred embodiments of the present disclosure and are not intended to limit the present disclosure. Any modification, equivalent replacement, improvement, etc. made within the spirit and principle of the present disclosure shall be included within the protection scope of the present disclosure.

What is claimed is:

1. A method for configuring an image forming apparatus network, comprising:
   receiving wireless connection information transmitted by an information processing apparatus, wherein the received wireless connection information includes a service set identifier (SSID) of a wireless access point (AP);
   searching neighboring wireless APs;
   obtaining and storing SSIDs, encryption manners, and protected management frame (PMF) attributes of the searched wireless APs;
   comparing the received SSID with the stored SSIDs;
   determining that there is a consistency between the received SSID and one of the stored SSIDs;
   obtaining, based on the determining, an encryption manner and a PMF attribute of the one of the stored SSIDs to be used as an encryption manner and a PMF attribute of the received SSID;
   generating a configuration file based on the encryption manner and the PMF attribute used for the received SSID; and
   connecting a wireless network according to the configuration file.

2. The method according to claim 1, wherein:
   searching the neighboring wireless APs includes: performing an all-channel scanning of the neighboring wireless APs;
   continuously transmitting multiple probe request frames one by one from a low channel to a high channel; and
   analyzing received probe response frames and beacon frames that are actively transmitted by the neighboring wireless APs.

3. The method according to claim 1, further comprising: before receiving the wireless connection information transmitted by the information processing apparatus, scanning the neighboring wireless APs and displaying a list of the searched wireless APs by the information processing apparatus.

4. The method according to claim 3, further comprising:
   specifying a wireless AP that needs to be connected by a user according to the list of the searched wireless APs, wherein an encryption manner does not need to be specified.

5. A system for configuring an image forming apparatus network, comprising:
   an information processing apparatus; and
   an image forming apparatus, wherein: the information processing apparatus includes:
   a memory storing a program; and a processor coupled with the memory,
   wherein when the program being executed, the information processing apparatus is configured to:
   search neighboring wireless APs and obtain a list of the searched wireless APs;
   and transmit wireless connection information of a wireless AP specified by a user to the image forming apparatus, wherein the wireless connection information includes an SSID of the specified wireless AP; and
   the image forming apparatus includes:
   a memory storing a program for performing a method for configuring an image forming apparatus network; and
   a processor coupled with the memory, wherein when the program being executed, the image forming apparatus is configured to:
   receive the wireless connection information transmitted by the information processing apparatus;
   search the neighboring wireless APs;
   obtain and store SSIDs, encryption manners, and protected management frame (PMF) attributes of the searched wireless APs;
   compare the received SSID with the stored SSIDs;
   determine that there is a consistency between the received SSID and one of the stored SSIDs;
   obtain, based on the determining, an encryption manner and a PMF attribute of the one of the stored SSIDs to be used as an encryption manner and a PMF attribute of the received SSID;
   generate a configuration file based on the encryption manner and the PMF attribute used for the received SSID; and
   connect a wireless network according to the configuration file.

6. The system according to claim 5, wherein:
   searching the neighboring wireless APs by the image forming apparatus includes:
   performing an all-channel scanning of the neighboring wireless APs;
   continuously transmitting multiple probe request frames one by one from a low channel to a high channel; and
   analyzing received probe response frames and beacon frames that are actively transmitted by the neighboring wireless APs.

7. The system according to claim 5, wherein: the wireless connection information does not include an encryption manner.

8. The system according to claim 5, wherein before receiving the wireless connection information transmitted by the information processing apparatus, the information processing apparatus is further configured to: scan the neighboring wireless APs and display a list of the searched wireless APs.

9. The system according to claim 8, wherein: a wireless AP that needs to be connected is specified by a user according to the list of the searched wireless APs, wherein an encryption manner of the wireless AP does not need to be specified.

10. A non-transitory computer-readable storage medium containing a computer program that, when being executed, causes a processor to perform a method for configuring an image forming apparatus network, the method comprising:
   receiving wireless connection information transmitted by an information processing apparatus, wherein the received wireless connection information includes a service set identifier (SSID) of a wireless access point (AP);
   searching neighboring wireless APs;
   obtaining and storing SSIDs, encryption manners, and protected management frame (PMF) attributes of the searched wireless APs;
   comparing the received SSID with the stored SSIDs;
   determining that there is a consistency between the received SSID and one of the stored SSIDs;
   obtaining, based on the determining, an encryption manner and a PMF attribute of the one of the stored SSIDs to be used as an encryption manner and a PMF attribute of the received SSID;
   generating a configuration file based on the encryption manner and the PMF attribute used for the received SSID; and
   connecting a wireless network according to the configuration file.

11. The non-transitory computer-readable storage medium according to claim 10, wherein:
   searching the neighboring wireless APs includes:
   performing an all-channel scanning of the neighboring wireless APs;
   continuously transmitting multiple probe request frames one by one from a low channel to a high channel; and
   analyzing received probe response frames and beacon frames that are actively transmitted by the neighboring wireless APs.

12. The non-transitory computer-readable storage medium according to claim 10, wherein before receiving the wireless connection information transmitted by the information processing apparatus, the method further comprises:
   scanning the neighboring wireless APs and displaying a list of the searched wireless APs by the information processing apparatus.

13. The non-transitory computer-readable storage medium according to claim 12, wherein the method further comprises:
   specifying a wireless AP that needs to be connected by a user according to the list of the searched wireless APs, wherein an encryption manner of the wireless AP does not need to be specified.

* * * * *